July 10, 1956

C. S. BROWN 2,754,108

VEHICLE WEIGHING APPARATUS

Filed Feb. 24, 1953

INVENTOR.
BY Cecil S. Brown.
Wood, Herron & Evans.
ATTORNEYS.

July 10, 1956

C. S. BROWN 2,754,108

VEHICLE WEIGHING APPARATUS

Filed Feb. 24, 1953

INVENTOR.
BY Cecil S. Brown.

Wood, Herron & Evans.
ATTORNEYS.

July 10, 1956
C. S. BROWN
2,754,108
VEHICLE WEIGHING APPARATUS
Filed Feb. 24, 1953
4 Sheets-Sheet 4
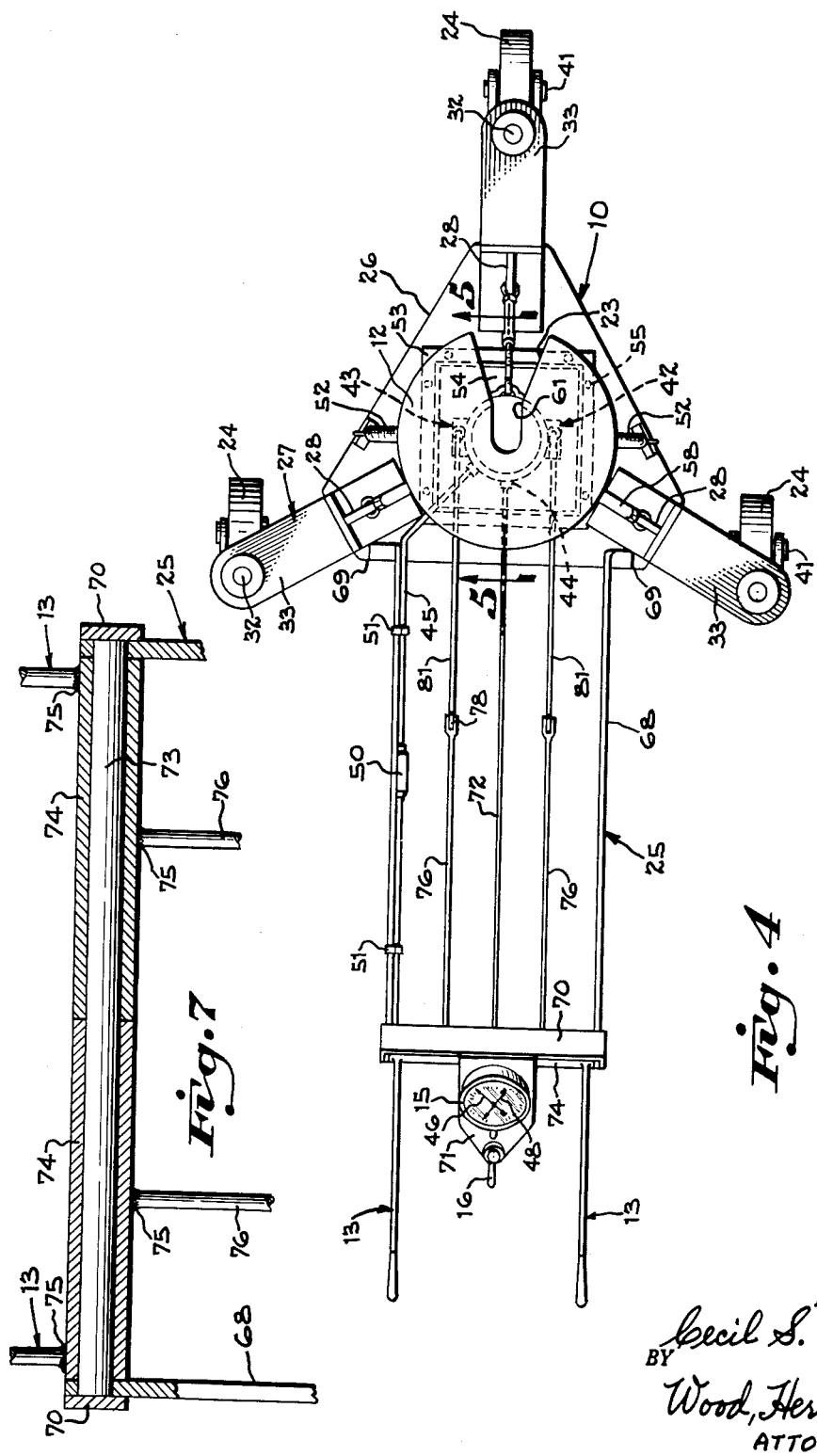
INVENTOR.
Cecil S. Brown.
BY Wood, Herron & Evans.
ATTORNEYS.

United States Patent Office 2,754,108
Patented July 10, 1956

2,754,108

VEHICLE WEIGHING APPARATUS

Cecil S. Brown, Atlanta, Ga.

Application February 24, 1953, Serial No. 338,238

3 Claims. (Cl. 265—40)

This invention relates to a weighing apparatus and in particular to a mobile scale adapted to engage and lift the fifth wheel of an uncoupled semi-trailer in order to indicate the weight load imposed upon it. The invention involves apparatus aspects, involving the measurement of the fifth wheel load and the use of this measurement in properly distributing the freight, preferably as it is loaded into the trailer.

A primary object of the invention has been to provide a weighing apparatus adapted to be applied to an uncoupled trailer and utilized as an indicating instrument in distributing the freight fore-and-aft of the trailer in order to provide substantially equal loading of the tractor and trailer axles when the two vehicles are later coupled together.

The term "semi-trailer," as used in the trucking industry, designates a trailer which includes road wheels at its rearward end and a fifth wheel structure at its forward end arranged to be coupled to and supported upon the mating fifth wheel of a tractor or towing vehicle. In coupled relationship, a draft connection is established by means of a king pin, which in the present example, is mounted upon the central axis of the trailer fifth wheel. A landing gear is also provided at the forward end of the trailer and is adapted to support the forward end of the trailer with respect to the ground when it is uncoupled from the tractor.

In order to provide good performance at high speeds during highway transport and to comply with state laws regarding the weight of the loaded vehicle, it is highly important that the freight load be properly distributed and balanced with respect to the trailer body. In a simple tractor-trailer combination of the type illustrated, it is critical that the load be evenly distributed relative to the fifth wheel and rear axle of the trailer since state laws, among other things, govern the maximum load carried upon any given axle of the vehicle. By way of example, many states by law provide a maximum limit of eighteen thousand pounds total load for each axle of the vehicle.

It is the conventional practice in the trucking industry to uncouple the semi-trailer from its tractor during the loading operation, such that the tractor can be utilized with other trailers instead of being tied up at the loading dock. Upon being uncoupled, the semi-trailer rests upon its landing gear and the present scale assembly may be conveniently shifted into a position beneath the trailer for indicating the fifth wheel load as the freight is placed in the trailer.

When the semi-trailer is coupled to the tractor, the trailer fifth wheel imposes its weight load directly upon the rear axle of the tractor, the tractor rear axle being known as the "pull axle" since it is the source of traction. It will be apparent therefore that if the weight load imposed upon the trailer fifth wheel is carefully measured during loading of the freight into the trailer, then the total load to be imposed upon the tractor pull axle can be determined before the two vehicles are coupled together.

The scale apparatus occupies the same position as is occupied by the fifth wheel of the tractor when coupled to the trailer; hence the load imposed upon the tractor pull axle, when coupled to the loaded trailer, will equal the total weight indicated by the scale, plus the weight of the rear end of the tractor. It will be apparent therefore, that if the total weight of the freight is known in advance or is tallied during the loading operation, then it is possible to determine in advance the proportion of the total load which will be carried by the tractor pull axle when the tractor is later coupled for road transport.

In the enforcement of the laws governing vehicle weight and axle loading of a semi-trailer of the type illustrated, the inspector conventionally measures the load imposed upon the tractor front axle, upon the tractor pull axle, and upon the trailer rear axle. By properly distributing the freight as outlined above, the trailer can be loaded to the total weight limit provided by law and the vehicle will pass inspection since each axle individually carries no more than its proportionate share of the load. On the other hand, if the same load is not properly distributed, then the tractor pull axle or trailer rear axle will be overloaded, resulting in a violation even though one or more axles of the vehicle are underloaded. Moreover, as indicated earlier, improper weight distribution makes the vehicle difficult to handle at high speeds and thus constitutes a source of danger.

A further object of the invention has been to provide a weighing scale which includes a saddle or load bearing plate generally similar to the fifth wheel of a tractor and including a lifting jack so arranged that the saddle can be placed in the position normally occupied by the tractor fifth wheel, elevated to lift the fifth wheel, and thus provide a direct indication of the fifth wheel load. For this purpose a hydraulic jack is utilized to elevate the saddle and a hydraulic pressure gauge is connected to the jack and calibrated to indicate the total weight load of the fifth wheel in pounds.

In its preferred embodiment, the weighing apparatus comprises a hydraulic jack mounted upon a wheeled dolly, the ram of the jack having mounted upon its upper end the saddle or load bearing plate which is substantially identical to the tractor fifth wheel. The scale assembly is adapted to be wheeled beneath the forward end of the trailer when the trailer is uncoupled and resting from its landing gear. The jack is then operated to elevate the ram and load bearing plate, such that the plate engages the tractor fifth wheel at the king pin and lifts the forward end of the trailer, thus transferring the weight load from the landing gear to the jack. The hydraulic pressure gauge is connected to the hydraulic jack, and being calibrated in pounds, indicates the total weight load which is carried by the trailer fifth wheel. The weight load indicated by the gauge will thus equal the weight which will be imposed by the trailer fifth wheel upon the pull axle of the tractor when coupled to the tractor, and if properly distributed, the load will be equalized between the tractor pull axle and rear axle of the trailer.

Another object has been to provide a mobile scale including a base having a substantial ground contact area suitable to stabilize the scale assembly when in load supporting position, and which is provided with casters which are adapted to retract and allow the base to contact the ground when the jack is operated to lift the trailer and thus provide a stabilized support for the trailer during the loading operation.

Other features and advantages of the invention will be apparent to those skilled in the art from the following detailed description, taken in conjunction with the drawings.

In the drawings:

Figure 4 is a general top plan view of the scale assembly.

Figure 5 is a sectional view taken on line 5—5, Figure 4, detailing the structural arrangement of the saddle or load bearing plate of the scale assembly in load supporting position with respect to the trailer fifth wheel.

Figure 6 is a fragmentary end elevation of the handle assembly showing the arrangement of the high and low pressure pump levers, and weight indicator dial.

Figure 7 is a sectional view taken on line 7—7, Figure 3, further detailing the pump handle structure.

Figure 1:
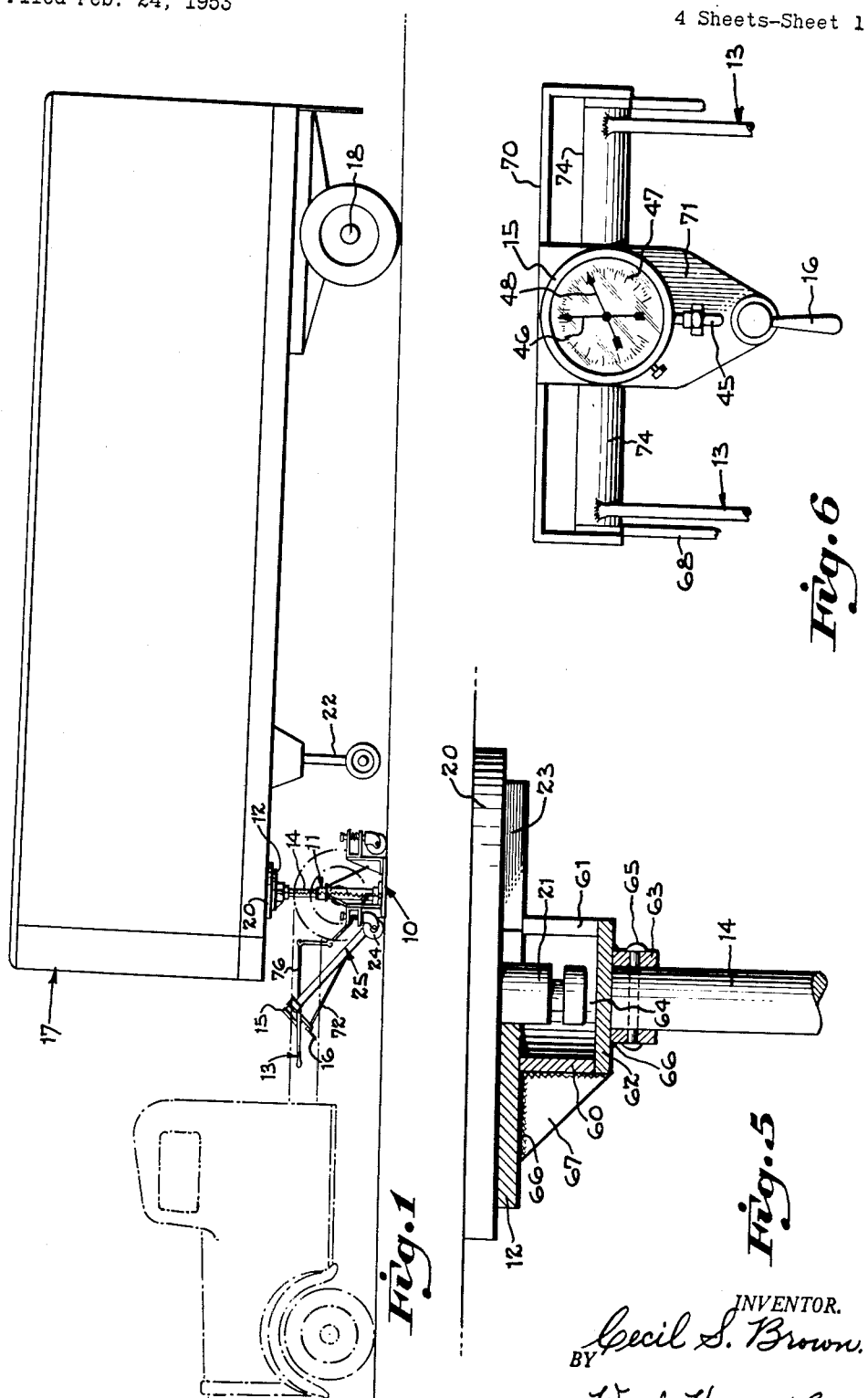
Figure 1 is a general side elevation of a semi-trailer with the present weight distribution scale in weighing position beneath the trailer fifth wheel.

As outlined above, the weight distribution scale is adapted to be wheeled beneath the forward end of a semi-trailer in a position to engage the trailer fifth wheel and lift the forward end of the trailer, thus the entire weight of the forward end of the trailer is imposed upon the scale. According to the conventional practice in loading, the semi-trailer is uncoupled from the tractor and its forward end is supported upon a landing gear which is extended to a lowered position as illustrated in Figure 1. The trailer thus may be parked at the loading dock and maintained in a substantially level position by the landing gear during the loading operation. When fully loaded, the tractor is again coupled, the landing gear is retracted and the vehicle is then ready for road service.

The fifth wheel equipment is well known in the industry and consists of a tractor fifth wheel mounted upon the tractor and having a slot facing rearwardly to receive the king pin of the trailer fifth wheel. The tractor fifth wheel includes coupling jaws which are arranged to establish a draft connection with the king pin when the tractor is backed into coupling position beneath the forward end of the trailer. The tractor fifth wheel is located at the rearward end of the tractor above the rear axle and when the trailer is coupled, its king pin is disposed in or near vertical alignment with the rear axle of the tractor, as indicated in broken lines in Figure 1. By virtue of this arrangement, the weight load of the forward end of the trailer is imposed directly upon the pull axle and tractor rear wheels.

As indicated earlier, the maximum permissible loads for highway transport vehicles is rigidly prescribed by the laws of various States, in order to prevent excessive wear and tear upon the highway system. In general, these laws set limits upon individual wheel loads, upon the total weight of the loaded vehicle and upon the load per axle. In loading a vehicle, the total load is usually known or can be computed, and if within legal limits and properly distributed, the individual wheel and axle loads will also be within limits. However, if the load is poorly distributed fore and aft, then the load imposed upon a given axle may exceed the limit and result in a violation, even though the vehicle proper is not overloaded. It follows therefore, that the most critical and practical method of load determination is to measure the individual axle loads.

In policing the highways for violation of the weight laws, the inspectors utilize scales of various types which are capable of measuring the axle loads of the vehicle. In the case of a simple semi-trailer unit of the type illustrated, the road inspector checks the tractor front axle, the tractor pull axle and the trailer rear axle. Portable scales may be used for this purpose and permanent check stations are also maintained along many highways. In permanent installations, a turnout from the main highway is provided and the vehicle may be driven conveniently from the highway and upon scale platforms arranged to indicate the total weight and the individual axle loads.

By way of example, a number of State laws provide a maximum load per axle of 18,000 pounds; thus, in order to transport maximum pay loads, it is imperative that the load be evenly distributed with respect to the axles. Since the laws provide penalties for overloading, many trucking companies lean over backwards to be on the safe side, often to the extent of allowing an unnecessarily wide margin of safety in the total load of the vehicle with a resulting loss of revenue. It will be apparent, that by proper weight distribution, the maximum permissible total load can be carried and such losses eliminated from the trucking operations.

The present weight distribution scale is intended to measure directly the weight load imposed upon the trailer fifth wheel while the trailer is being loaded, thus determining in advance, the weight or proportion of the load which will be imposed upon the tractor rear axle when the vehicle is coupled, bearing in mind that the fifth wheel imposes its load directly upon the tractor axle. The attainment of proper load distribution is particularly difficult in loading mixed freight, consisting of a variety of articles having different weights and sizes. However, since the present structure measures the weight directly, such cargoes can be correctly distributed fore and aft in accordance with the weight indication of the scale.

Briefly described, the scale consists of a wheeled dolly, indicated generally at 10 in Figure 1, which provides a mobile supporting base for the scale assembly. Mounted upon the dolly is a hydraulic jack, indicated generally at 11, having upon the upper end of its ram a saddle or pressure plate 12, which generally duplicates the fifth wheel of the tractor and thus mates with the trailer fifth wheel. The hydraulic jack which is disclosed in the drawings is of commercial design and includes high and low pressure hydraulic pumps which are operated by the pump handles indicated generally at 13.

Operation of the pump handles is effective to elevate the ram 14 of the jack under hydraulic pressure, causing the saddle to engage the fifth wheel and lift the forward end of the trailer, as shown in Figure 1. The weight thus imposed upon the hydraulic jack is indicated by the direct reading hydraulic pressure gauge 15, which is calibrated to indicate the total load in pounds. The hydraulic jack is provided with a bypass or release valve, actuated by the control handle 16 (Figure 6), which upon being shifted to relief position, allows the hydraulic fluid to bypass from the ram cylinder back to its reservoir when the ram is to be lowered.

As noted above, the semi-trailer, indicated generally at 17, is provided with a rear axle 18 including road wheels for supporting its rearward end and is provided with a fifth wheel plate 20 at its forward end including the king pin 21 (Figure 5). Before uncoupling the trailer from its tractor, the landing gear 22 is shifted to its lowered position, thus as the tractor is pulled away, the forward end of the trailer drops down until the landing gear engages the ground.

Referring to Figure 4, it will be noted that the load bearing plate or saddle 12 is provided with a pie-shaped slot 23 which faces rearwardly, being generally similar to the standard fifth wheel of a tractor. The scale assembly is conveniently wheeled into position beneath the trailer fifth wheel, having casters 24 which support the dolly and a handle assembly 25 which projects outwardly and upwardly from the dolly. As best shown in Figure 4, the handle assembly allows the unit to be wheeled to its operating position and the pie-shaped slot 23 guides the load bearing plate 12 accurately into registry by engagement with the king pin of the trailer fifth wheel. It will be understood of course, that before being wheeled in place, the ram and load bearing plate are lowered sufficiently to pass without interference under the trailer fifth wheel.

Upon being properly positioned, as shown in Figure 5, the pump handles 13 are operated, causing the ram to ascend until the load bearing plate engages the fifth wheel and lifts the trailer clear of its landing gear. In order to provide a firm support, the casters are spring mounted and are adapted to retract as the trailer is jacked up; hence as shown in Figure 1, the dolly 10 when loaded, rests directly upon the ground and provides a large base area, which stabilizes the jack and prevents tipping.

Described in detail with reference to Figures 3 and 4, the dolly comprises a base 26 formed of a relatively thick steel plate, preferably in the form of an equilateral triangle as viewed from above. The casters 24 are located at the three angles of the base plate upon mounting brackets 27, which are welded or otherwise secured to the plate. Each bracket 27 is generally right angular, as viewed in Figure 3, and each is provided with a reinforcing strut or gusset plate 28, which is welded to the bracket as at 30. The base of bracket 27 is welded directly to the surface of plate 26, as at 31.

Figure 2:
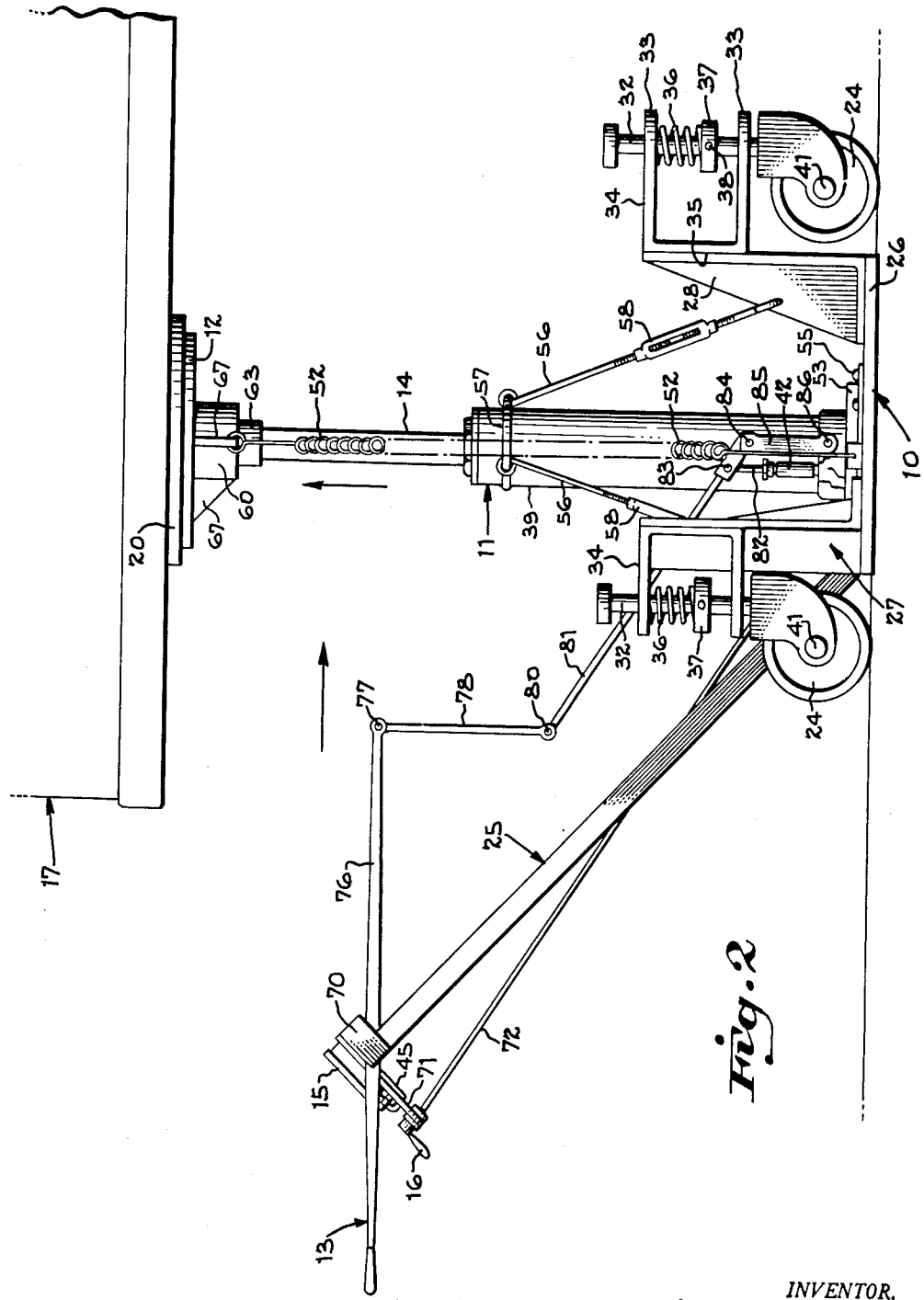
Figure 2 is an enlarged side elevation of the scale assembly taken from Figure 1, further illustrating the general construction and arrangement.

Each caster 24 includes a vertical spindle 32 slidably passing through the spaced limbs 33—33 of a U-shaped bracket 34 which is welded as at 35 to the angle bracket 27. Each spindle and its caster is normally urged downwardly to the extended position shown in Figure 3 by means of a spring 36, which is mounted under compression between the upper limb 33 and a collar 37, which is pinned as at 38 to the spindle 32. The three springs 36, collectively provide sufficient resistance to support the base plate and its associated parts in the elevated position shown in Figure 3, such that the scale assembly may be wheeled about without difficulty. However, upon engaging the trailer fifth wheel, the ram forces the base plate downwardly, compressing the springs 36, as shown in Figure 2. It will be noted that sufficient clearance, as indicated at 40 in Figure 3, is provided between the ground level and base plate to accommodate for uneven ground and that when loaded, the base plate rests directly upon the ground without imposing the trailer weight load upon the casters.

The caster spindles 32 are rotatably journalled in the U-shaped brackets 34, and the shafts 41 of the caster wheels are displaced laterally from the vertical axis of the spindles in the usual manner to provide the tracking or caster effect. It will also be noted in Figure 2 that the U-shaped brackets 34 overhang the mounting brackets 27 a sufficient distance to allow the casters to swivel without interference as the scale assembly is maneuvered.

As explained earlier, the hydraulic jack 11 is a commercial product and need not be disclosed in detail; however the general structure and operation of such jacks is pertinent to the nature and principles of the invention. According to the structure selected for purposes of illustration, the jack includes an external casing 39 which surrounds and is spaced outwardly from the ram cylinder (not shown), forming a reservoir for the hydraulic fluid. The high and low pressure hydraulic pumps of the jack, which are indicated generally at 42 and 43 in Figure 4, communicate with the reservoir and include passageways leading to the ram cylinder. The pumps are thus adapted to force the hydraulic fluid into the ram cylinder upon reciprocation of the pump plungers by the pump handles 13. The hydraulic passageways leading from the pumps to the ram cylinder are provided with check valves arranged to block backflow of hydraulic fluid such that the ram is hydraulically locked in elevated position after having been jacked up.

As explained earlier, the jack includes a bypass valve in its base which is indicated generally at 44 in Figure 4. This valve is interposed in a bypass circuit leading from the ram cylinder back to the hydraulic reservoir and is under the control of the control handle previously indicated at 16. When handle 16 is shifted to relief position, the valve is opened, allowing the hydraulic fluid to flow from the ram cylinder back to the hydraulic reservoir, thus causing the ram to descend under the influence of the weight load imposed upon it.

The present hydraulic jack has an exceptionally high lift to accommodate the fifth wheels of various trailers which may be encountered in everyday service, and to compensate for uneven terrain. In its preferred form the ram provides a hydraulic lift in the neighborhood of twenty inches, to compensate for variable factors; however a few inches actual lift is sufficient to raise the landing gear out of engagement with the ground and indicate the total load. For the sake of efficiency, the low pressure pump provides a high volume low pressure displacement and is utilized to elevate the ram rapidly during the preliminary lift of the saddle. Upon contacting the fifth wheel and forcing the base plate into ground contact, the high pressure pump is operated to elevate the ram under high pressure but at a slower rate. The two pumps thus allow the trailer to be jacked up rapidly and without undue exertion, since the high pressure pump lever, which does the actual lifting, is easily operated.

As best shown in Figure 4, the indicating gauge 15 is connected by means of the tube 45 to the base of the jack and is arranged to indicate the total weight load imposed on the ram directly in pounds. The indicator is a commercial fluid pressure gauge and the tube 45 communicates directly with the interior of the ram cylinder such that the gauge responds to the hydraulic pressure within the ram cylinder. As shown in Figure 6, the gauge includes a conventional pointer 46, which moves with respect to the graduations 47 to indicate the load, and may further include a maximum load indicator 48 which can be set by hand to indicate the maximum permissible fifth wheel load.

In order to prevent the pointer 46 from snapping or deflecting rapidly under pressure impulses while the jack is being raised and when the pressure is released, a choker valve 50 is inserted in the tube 45. This valve is also a conventional structure, usually in the form of an adjustable needle valve, which throttles the flow of hydraulic fluid and thus prevents sudden changes in pressure. The valve and tube are secured to the handle assembly by means of the clips 51.

During downward movement of the ram, only a fraction of its total lift is acted upon by the weight load of the trailer, and for this reason, the jack is provided with one or more tension springs indicated at 52, which extend from the base plate to the saddle structure at the upper end of the ram. These springs bias the ram under a tension of several hundred pounds and are effective to pull the ram downwardly to its lower limit of travel, as indicated in Figure 3, when the release handle 16 is shifted to ram lowering position.

The hydraulic jack is located permanently in position upon the base plate 26 by means of retainer flanges 53, which are in the form of angle strips arranged to form a frame surrounding the base 54 of the jack. The flanges are secured in position upon the base plate by means of screws 55 passing through the angle strips and anchored in the base plate.

In addition to the retainer frame, the jack is braced rigidly in vertical position by means of the bracing rods 56, preferably three in number, which extend from the upper end of the jack to the base plate structure. As shown, the upper ends of the rods are anchored upon a ring 57, which is preferably welded to the casing of the jack, while the lower ends of the rods are hooked into the gusset plates 28. In order to allow the jack to be adjusted perpendicularly with respect to the base plate, the bracing rods are sectional and have their intermediate ends threaded into adjustable turn buckles 58.

As explained earlier, the saddle or load bearing plate 12 is similar to the tractor fifth wheel and its pie-shaped slot 23 serves to align the saddle and ram axially with the king pin 21. This arrangement insures that the weight load will correspond to the weight load imposed upon the tractor pull axle since the king pin is aligned with the axle when in coupled position.

In the conventional fifth wheel construction, the king pin is designed to withstand heavy draft loads but is not intended to bear the weight of the trailer. For this purpose the load bearing plate 12 is provided with a housing 60 arranged to protect the king pin, as best shown in Figure 5. Housing 60 is generally cylindrical, as viewed in Figure 4, and includes an opening 61 in alignment with the pie-shaped slot 23 to allow entry of the king pin. The housing 60 is provided with a bottom wall or plate 62 which includes a hub 63 located upon the central axis of the cylindrical housing. It will be noted in Figure 5, that the housing 60 is sufficiently deep to provide the clearance, indicated at 64 between the lower end of the king pin and the bottom plate 62, such that no axial load is imposed on the pin.

The upper end of the ram 14 extends into the hub and its upper end is in bearing engagement against the bottom plate 62. The hub is secured to the ram by means of a taper pin or rivet 65, as shown in Figure 5. The load bearing plate and its housing are of welded construction, the various parts being joined by the welds indicated at 66. In order to further strengthen the assembly, a series of gusset plates 67 extend angularly from the bottom of the load bearing plate to the side of housing 60. The gusset plates are also secured by welding, as indicated at 66. By virtue of the engagement of the king pin in the slot 23, the load bearing plate is securely locked against radial movement relative to the trailer fifth wheel, and in cooperation with the base plate 26, rigidly supports the trailer during the loading process.

As previously noted, the handle assembly 25 mounts the pump handles 13, the weight indicator gauge 15 and the control or release handle 16. As best shown in Figure 4, the handle assembly comprises a generally U-shaped frame 68 having the lower ends of its limbs welded as at 69 to the rear edge of base plate 26. The frame rises upwardly in an inclined plane from the base plate to a convenient elevation and includes at its upper end a cross member 70 upon which is mounted the weight indicating gauge 15 and control handle 16.

As best shown in Figure 6, a mounting plate 71 is fastened to the cross member and provides a support for the gauge and also provides a bearing for rotatably mounting the release handle 16. This arrangement supports the gauge in a position clear of the forward end of the trailer as shown in Figure 1 for adequate lighting and in a position for convenient observation by the operator. The release handle 16 is also disposed in a position for convenient operation and is connected to the bypass valve 44 by means of the rod 72.

The pump handles indicated at 13, form an extension of the handle assembly, and the structure is adapted to fit beneath the overhanging end of the trailer with considerable operating clearance, as indicated in Figure 1. As explained earlier, the jack is provided with high and low pressure pumps indicated at 42 and 43 in order to provide convenient and rapid operation of the ram and its saddle. Referring to Figure 4, it will be noted that each pump is provided with an individual pump handle 13 for selective operation. The pump handles are journalled in common upon a cross shaft 73 (Figure 7) which extends across the upper end of the U-shaped frame in parallelism with the cross member 70.

Each pump handle 13 includes a sleeve 74 loosely journalled upon the cross shaft, the pump handles being welded as at 75 to the respective sleeves. Each sleeve further includes a lever 76, which is also welded to the sleeve as at 75, with the levers projecting forwardly toward the jack. Each lever 76 is pivotally connected as at 77 to a link 78 (Figure 3) and the lower end of each link is pivotally connected as at 80 to the swinging end of a respective pump lever 81. According to this arrangement, each pump handle 13 and its associated linkage system may be operated individually to selectively provide the high and low speed ram operation. The effective stroke of the link and lever system is indicated by the broken lines in Figure 3.

Figure 3:
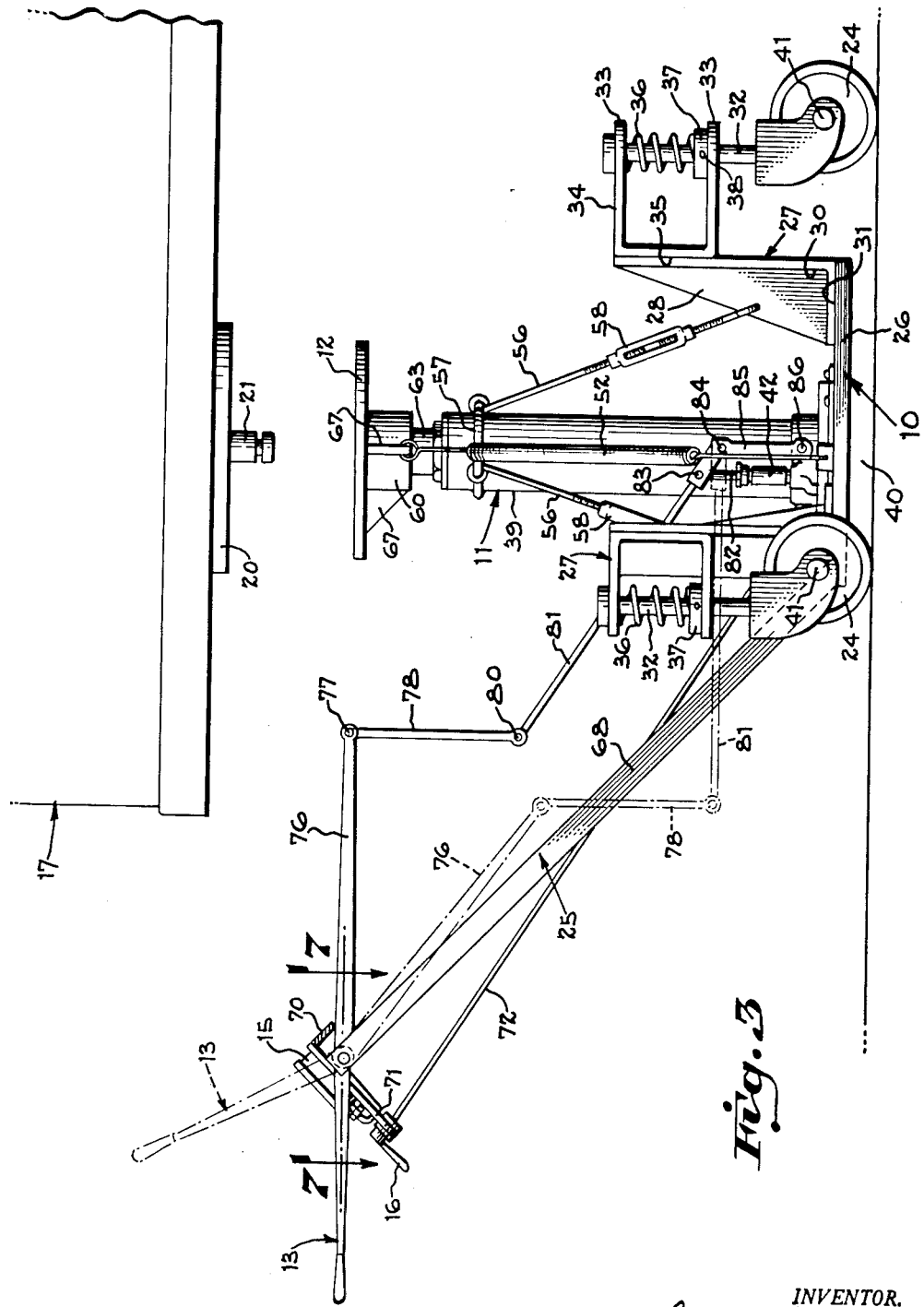
Figure 3 is a side elevation similar to Figure 2, showing the scale assembly in its lowered position with respect to the trailer fifth wheel.

The connection of the pump levers 81 to the respective pumps 42 and 43 is indicated in Figure 3 and is conventional. As shown, each pump includes a plunger 82 having its upper end pivotally connected, as at 83, to the pump lever. In order to convert the normally arcuate motion of pivot point 83 to straight line motion, the lower end of the pump lever 81 is pivotally connected, as at 84 to a link 85 which has its lower end pivotally connected to the base of the jack as at 86.

The link and lever system provides a pumping stroke for the swinging end of the pump levers 81, which is approximately equal to the motion at the swinging ends of the handles 13 to provide easy operation. When not in use, it will be noted that the cross member 70 engages the levers 76, as shown in Figure 3, and thus supports them in their level position. In this position, the pump handles provide extensions which are utilized to manipulate the scale assembly.

As pointed out earlier, the distribution of the load is carried out preferably while the freight is being loaded into the trailer; however, it will be understood that the distribution of weight can also be checked after the trailer is fully loaded, if certain weight factors, as outlined later, are taken into account. If distribution is to be carried out during the loading operation, the scale assembly is wheeled into position before loading is started and is operated to lift up the forward end of the trailer, as indicated in Figure 1. The scale assembly is left in this position during loading and the pressure gauge 15 will indicate the weight of the unloaded trailer which is imposed upon its fifth wheel, and the progressive weight increase as loading proceeds.

An example of the loading procedure may be taken with reference to the semi-trailer illustrated in Figure 1. Although the relationship of the rear axle and fifth wheel may differ for various trailers, from the illustration it may be assumed that the weight of the trailer body itself, when unloaded, is divided equally between the rear axle and fifth wheel and that the freight load also should be divided equally. The total weight of the freight to be loaded can be determined in advance or during the loading operation, and it is a relatively simple procedure to distribute the various pieces of freight fore and aft within the trailer in accordance with the weight reading of the pressure gauge to bring the loading of the fifth wheel up to a predetermined proportion of the total weight load.

It will be understood that the weight of the tractor and trailer is included in the maximum axle loads and must be deducted from the pay load. By way of example, if the maximum allowable load per axle is 18,000 pounds, then the permissible pay load would be 36,000 pounds, minus the weight of the trailer. As an additional factor, the normal weight carried by the uncoupled tractor rear axle should be deducted from the permissible load figure for the trailer fifth wheel.

Assuming, that the weight of the unloaded trailer is known, this load figure is deducted from the 36,000 pound overall weight limit to arrive at the permissible pay load figure. The weight carried by the uncoupled trailer rear axle is then deducted from one-half the permissible pay load figure and the remainder, or fifth wheel figure, represents the load to be carried by the trailer fifth wheel. When the weight reading of the gauge reaches the fifth wheel figure, the freight will be evenly distributed with respect to the tractor and trailer axles; thus, when the two vehicles are coupled together, their axle loads will be substantially equal and will not exceed the legal limits.

It will be noted in Figure 1, that the forward end portion of the trailer overhangs the fifth wheel and that the rearward end portion overhangs the trailer rear axle. The load carried by the rearward overhang, that is the area extending rearwardly beyond the rear axle, by fulcrum effect, will decrease the load imposed upon the fifth wheel. Therefore during the loading operation, if the fifth wheel load increases beyond the calculated total figure, it can be decreased by shifting freight rearwardly to the overhanging portion of the trailer.

From the foregoing, it will be understood that the weight distribution procedure can also be applied to trailers having two or more sets of axles. In all cases, the load bearing relationship of the wheels with respect to one another and to the fifth wheel must be taken into account in arriving at the permissible fifth wheel load figure. It is to be noted, that the weight characteristics of the various trailers and tractors can be formulated in advance such that the total permissible pay load and fifth wheel load figures can be posted upon each vehicle for convenience. It will also be understood that once the correct load factors and maximum allowable pay load are known, each vehicle can be loaded up to its maximum pay load capacity without danger of overloading the individual axles.

The foregoing description of load formulation is intended only to exemplify the use of the invention since it will be apparent that other procedures can be devised. For example, the scale assembly can be utilized to check the weight distribution after the vehicle is loaded since the jack has sufficient lifting capacity to elevate the loaded trailer and indicate its weight distribution at the fifth wheel.

As explained earlier, the load bearing plate illustrated in the drawings is intended for standard structures in which the king pin is carried by the trailer fifth wheel. However, it will be understood that the principles of the present invention can be applied to fifth wheel structure in which the king pin is carried by the tractor fifth wheel. In this event, the load bearing plate or saddle will include a king pin adapted to engage the slot of the trailer fifth wheel and the relationship of the parts will correspond to that shown in Figure 5 except that the structure is inverted from the position shown.

I claim:

1. A weighing apparatus adapted to engage and lift the fifth wheel of an uncoupled trailer and to indicate the weight load imposed thereon, said weighing apparatus comprising a base adapted to rest upon the ground, a plurality of rollers yieldably mounted upon said base plate and normally supporting the same in elevated plane relative to the ground, a hydraulic jack mounted upon said base, said hydraulic jack having a ram extending upwardly therefrom, a saddle mounted upon the upper end of said ram, said saddle substantially duplicating the structure of a tractor fifth wheel and mating with the trailer fifth wheel, the saddle having an open slot to receive the king pin when the saddle is engaged against the fifth wheel with the king pin projecting downwardly through said slot, a housing secured to the bottom of the saddle and partially surrounding said opening and providing clearance for the projecting portion of the king pin, the lower end of said housing being connected to the upper end of the said ram, hydraulic pump means for forcing said ram and saddle upwardly to cause said saddle to engage the trailer fifth wheel and force the base relative to said rollers into contact with the ground and thereafter lift the trailer, and a hydraulic pressure gauge connected to said jack, said gauge being responsive to the hydraulic pressure developed by the weight load upon said ram and thereby indicating the total weight load imposed by the fifth wheel upon said saddle.

2. A weighing apparatus adapted to engage and lift the fifth wheel of an uncoupled trailer to indicate the weight load imposed by the trailer upon the fifth wheel, said fifth wheel being of the type having a king pin adapted to be coupled to a tractor fifth wheel, said weighing apparatus comprising a base plate adapted to rest upon the ground, a lifting jack mounted upon said base plate, a vertically movable lifting member extending from the upper end of said jack, a saddle mounted upon the upper end of said lifting member, said saddle being engageable with the fifth wheel of the trailer, said saddle having a slot to receive said king pin when the saddle is engaged against the fifth wheel, said slot locking the saddle relative to the fifth wheel, with the king pin projecting downwardly through said slot, an open housing interposed between the lifting member and saddle and partially surrounding said slot and saddle, the housing supporting the saddle in spaced relation above the lifting members, thereby providing clearance for the downwardly projecting portion of the king pin, means for elevating said lifting member and saddle whereby the saddle is effective to elevate the fifth wheel and forward end of the trailer, and a weight indicating gauge connected to said jack and responsive to the weight load imposed by the trailer fifth wheel upon said saddle and lifting member.

3. A weighing apparatus adapted to engage and lift the fifth wheel of the uncoupled trailer to indicate the weight load imposed by the trailer upon the fifth wheel, said fifth wheel being of the type having a king pin adapted to be coupled to a tractor fifth wheel, said weighing apparatus comprising a base plate adapted to rest upon the ground, a lifting jack mounted upon said base plate, a vertically movable lifting member extending from the upper end of said jack, a saddle engageable with the fifth wheel of the trailer, said saddle having a slot to receive said king pin when the saddle is engaged against the trailer fifth wheel, a housing secured to the bottom of the saddle and projecting downwardly therefrom, said housing partially surrounding said slot and having an opening in the side thereof in registry with said slot, said housing surrounding the king pin and having a bottom plate disposed in a plane below the lower end of the king pin when the saddle is in coupled position, said bottom plate being fastened upon the upper end of said lifting member, said jack elevating said lifting member and saddle whereby the saddle is effective to elevate the fifth wheel and forward end of the trailer, and a weight indicating gauge connected to said jack and responsive to the weight load imposed by the trailer fifth wheel upon said saddle and lifting member.

References Cited in the file of this patent

UNITED STATES PATENTS

| | | |
|---|---|---|
| 454,249 | Bache | June 16, 1891 |
| 932,050 | McFarlane | Aug. 24, 1909 |
| 1,012,632 | Groome | Dec. 26, 1911 |
| 1,828,022 | Brand | Oct. 20, 1931 |
| 1,977,930 | Williams | Oct. 23, 1934 |
| 2,373,469 | Grime | Apr. 10, 1945 |
| 2,457,655 | Gifford | Dec. 28, 1948 |
| 2,477,854 | Baker | Aug. 2, 1949 |
| 2,479,679 | Grime | Aug. 23, 1949 |
| 2,482,027 | Poole | Sept. 13, 1949 |
| 2,490,199 | Bour | Dec. 6, 1949 |
| 2,567,681 | Schwartz et al. | Sept. 11, 1951 |
| 2,577,691 | Shrader et al. | Dec. 4, 1951 |

FOREIGN PATENTS

| | | |
|---|---|---|
| 829,806 | Germany | Jan. 28, 1952 |